USOO5784201A

United States Patent [19]

Lee et al.

[11] Patent Number: 5,784,201

[45] Date of Patent: Jul. 21, 1998

[54] REFLECTION-PREVENTING LAYER FOR A DISPLAY DEVICE

[75] Inventors: Kyeong Won Lee, Kyungki-do; Kyung Chan Park, Seoul, both of Rep. of Korea

[73] Assignee: LG Electronics Inc., Seoul, Rep. of Korea

[21] Appl. No.: 527,657

[22] Filed: Sep. 13, 1995

[30] Foreign Application Priority Data

Mar. 17, 1995 [KR] Rep. of Korea ............... 5623/1995

[51] Int. Cl.$^6$ ............... G02B 1/10; H01J 31/00
[52] U.S. Cl. ............... 359/582; 359/588; 313/479
[58] Field of Search ............... 359/581, 582, 359/588; 313/474, 479, 489

[56] References Cited

U.S. PATENT DOCUMENTS

| | | | |
|---|---|---|---|
| 5,135,808 | 8/1992 | Kimock et al. | 428/336 |
| 5,425,983 | 6/1995 | Propst et al. | 428/216 |
| 5,508,368 | 4/1996 | Knapp et al. | 427/534 |

FOREIGN PATENT DOCUMENTS

| | | | |
|---|---|---|---|
| 55-117106 | 9/1980 | Japan | 359/588 |
| 63-175801 | 7/1988 | Japan | 359/581 |
| 63-175802 | 7/1988 | Japan | 359/581 |
| 63-175803 | 7/1988 | Japan | 359/581 |
| A-63-294501 | 12/1988 | Japan | G02B 1/10 |
| 2225449 | 5/1990 | United Kingdom | 359/582 |

*Primary Examiner*—Paul M. Dzierzynski
*Assistant Examiner*—John Juba, Jr.
*Attorney, Agent, or Firm*—John P. White; Cooper & Dunham LLP

[57] ABSTRACT

A reflection-preventing layer for a display device includes a transparent insulating substrate, at least one dielectric film formed on the transparent insulating substrate, and an amorphous carbon thin-film layer having a diamond-like carbon film on the uppermost dielectric layer of the dielectric films, so that the reflectance of the reflection-preventing layer is semi-permanently decreased while increasing the surface solidity thereof.

13 Claims, 9 Drawing Sheets

F I G.6
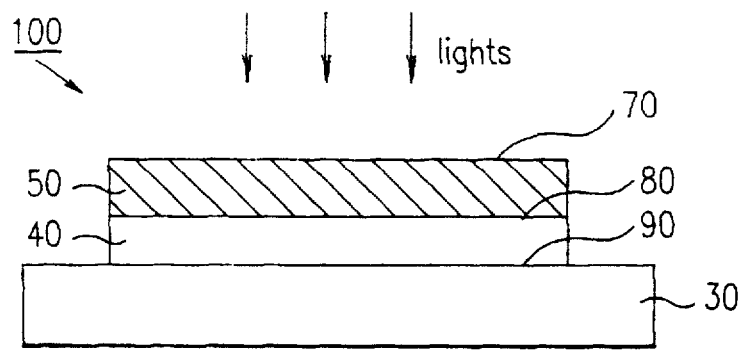
F I G.7a
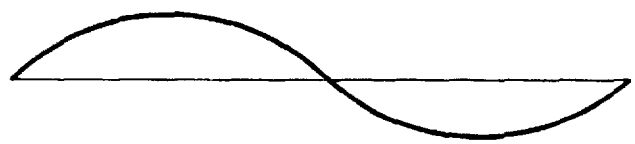
F I G.7b
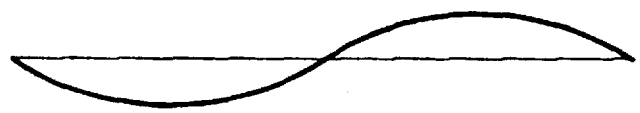
F I G.7c
F I G.7d

F I G.15
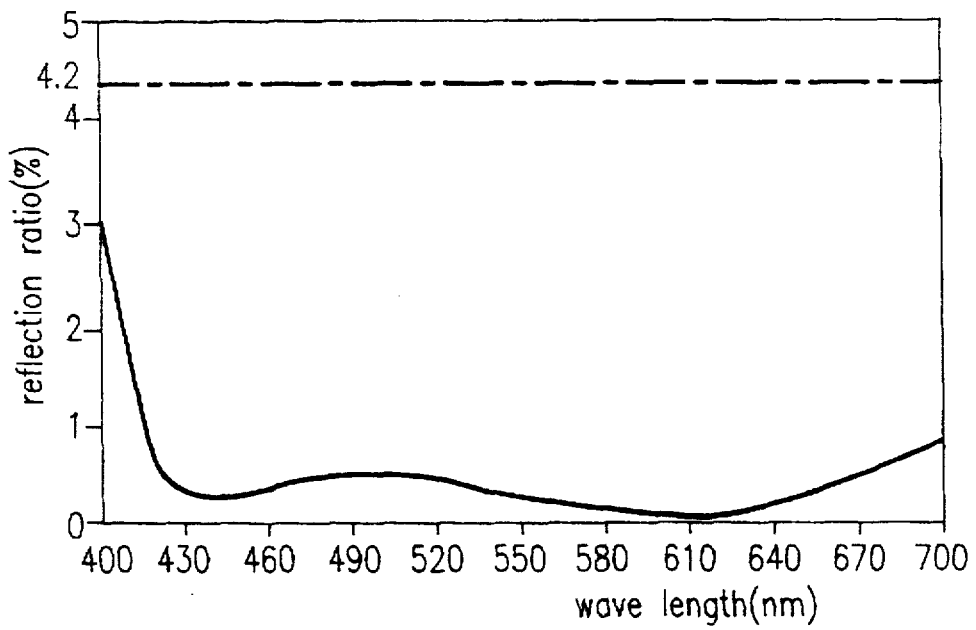
F I G.16
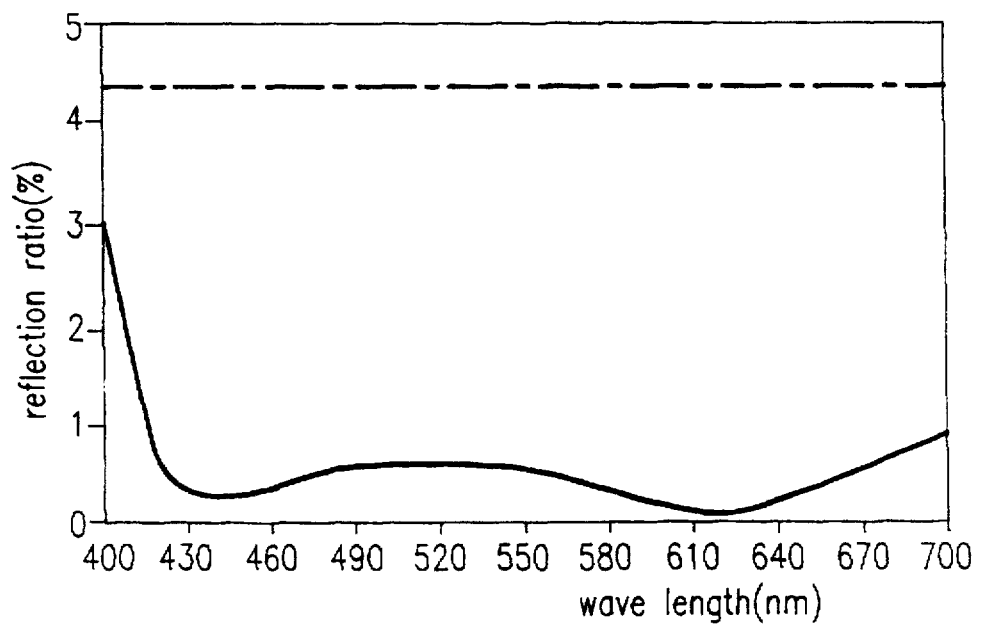

F I G.17
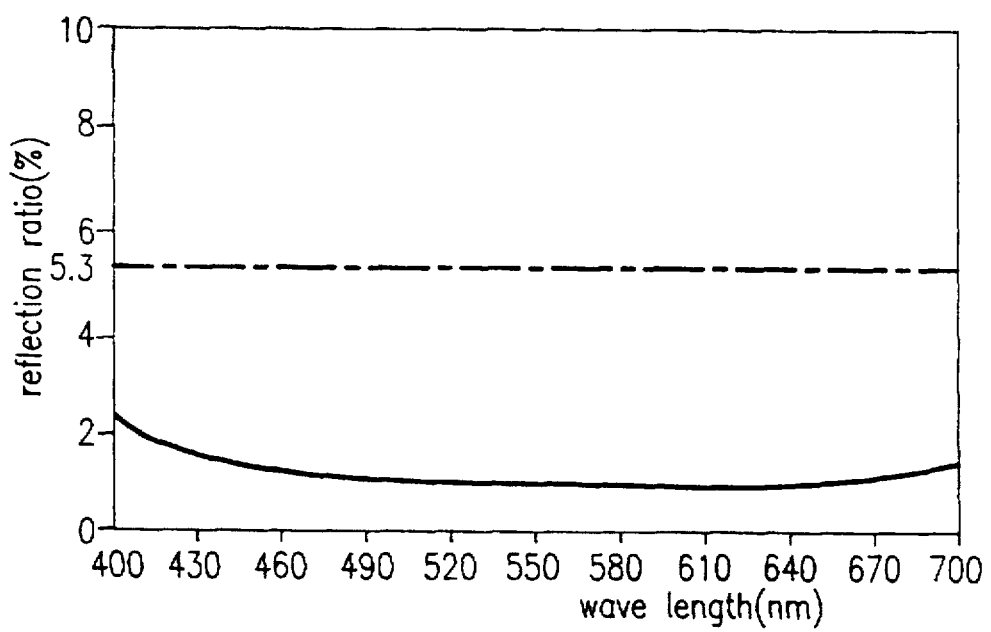

REFLECTION-PREVENTING LAYER FOR A DISPLAY DEVICE

BACKGROUND OF THE INVENTION

The present invention relates to a reflection-preventing layer for a display device.

A reflection-preventing layer generally refers a coating layer which functions by lowering a light refractivity when external light is reflected from a display side of liquid crystal displays or other display devices such as television Brawn tubes and monitors.

By providing the reflection-preventing layer on the surface of a substrate of the display devices, the light reflectance is lowered to make a viewer feel less fatigue in the eye.

In addition, the reflection-preventing layer enables the viewer to definitely recognize information displayed on display devices, i.e., captions of various types.

A conventional reflection-preventing layer having the general functions will be described in detail with reference to FIG. 1.

FIG. 1 is a sectional view showing a structure of the conventional reflection-preventing layer.

Referring to FIG. 1, the conventional reflection-preventing layer 1 is formed of a transparent insulating substrate 10, and a dielectric layer 20 formed on transparent insulating substrate 10 (e.g., a polarization plate of the liquid crystal display).

Here, dielectric layer 20 is formed of a first dielectric film 20a, a second dielectric film 20b, a third dielectric film 20c and a fourth dielectric film 20d.

Respective dielectric films 20a, 20b, 20c and 20d are formed of a dielectric material selected from a group consisting of $SiO_2$, $TiO_2$, and $CeO_2$.

A display device applied with the conventional reflection-preventing layer constructed as above will be described in detail with reference to FIG. 2.

FIG. 2 is a schematical section view showing a structure of the liquid crystal display applied with the conventional reflection-preventing layer.

Referring to FIG. 2, the liquid crystal display includes a liquid crystal display panel 5 sandwiched between two glass substrates (not shown), polarization plates 10a and 10b respectively installed between the upper and lower surfaces of liquid crystal display panel 5, and a reflection-preventing layer 1 formed on the upper surface of polarization plate 10a of one side.

The operation and effect of the reflection-preventing layer in the conventional liquid crystal display constructed as above will be described below.

First, polarization plates 10a and 10b transmit light polarized only in a certain direction. At this time, straightly polarized light is incident via the lower polarization plate 10b of a write side B, which then transmits via the upper polarization plate 10a of a display side A.

Meantime, reflection-preventing layer 1 formed on upper polarization plate 10a decreases the amount of the reflected light irradiated from outside onto polarization plate 10a of display side A.

Reflection-preventing layer 1 serves for improving a transmittance characteristic of the light transmitting through a liquid crystal (not shown) forming liquid crystal display panel 5, other plurality of layers (not shown), upper polarization plate 10a and an air layer of display side A.

However, the material forming the reflection-preventing layer 1 is deteriorated and the surface of the layer is damaged with the lapse of time, thereby gradually lowering the reflection preventing effect.

Thus, there is a problem that the viewer cannot clearly perceive the captions displayed via the display device.

Also, the reflection-preventing layer is formed of only the dielectric materials to have a low surface solidity, so that, in case of the display device using the reflection-preventing layer, overall surface solidity is lowered to be apt to degrade the characteristic of the display device.

SUMMARY OF THE INVENTION

The present invention is devised to solve the above-described problems. Accordingly, it is an object of the present invention to provide a reflection-preventing layer for a display device capable of semi-permanently decreasing the reflectance of the reflection-preventing layer.

It is another object of the present invention to provide a reflection-preventing layer for a display device capable of increasing the surface solidity of the reflection-preventing layer.

To achieve the above object of the present invention, there is provided a reflection-preventing layer for a display device including a transparent insulating substrate, at least one dielectric film formed on the transparent insulating substrate, and a diamond-like carbon film formed on the uppermost dielectric film among the dielectric films.

A first embodiment of the present invention includes a transparent insulating substrate, even-numbered dielectric films sequentially formed on the transparent insulating substrate, and a diamond-like carbon film formed on the uppermost dielectric film among the dielectric films.

A second embodiment of the present invention includes a transparent insulating substrate, at least three odd-numbered dielectric films formed on the transparent insulating substrate, and an amorphous carbon thin-film layer having a diamond-like carbon film formed on the uppermost dielectric film among the dielectric films.

A third embodiment of the present invention includes a transparent substrate, one dielectric film formed on the transparent substrate, and a diamond-like carbon film formed on the dielectric film.

BRIEF DESCRIPTION OF THE DRAWINGS

The above objects and other advantages of the present invention will become more apparent by describing in detail preferred embodiments thereof with reference to the attached drawings in which:

FIG. 6 is a sectional view showing the border planes of respective layers constituting the reflection-preventing layer according to the present invention;

FIGS. 7a to 7d are waveforms of reflected light showing the phase state thereof according to the wavelength at each border plane of FIG. 6;

FIG. 15 is a graph representation plotting the reflectance of the reflection-preventing layer of FIG. 11c according to the first embodiment of the present invention which is obtained in accordance with the wavelength by the external light at the reflection-preventing layer;

FIG. 16 is a graph representation plotting the reflectance of the reflection-preventing layer of FIG. 11d according to the first embodiment of the present invention which is obtained in accordance with the wavelength by the external light at the reflection-preventing layer; and FIG. 17 is a graph representation plotting the reflectance according to the third embodiment of the present invention, which is obtained in accordance with the wavelength by the external light at the reflection-preventing layer.

DETAILED DESCRIPTION OF THE PREFERRED EMBODIMENTS

Figure 3:
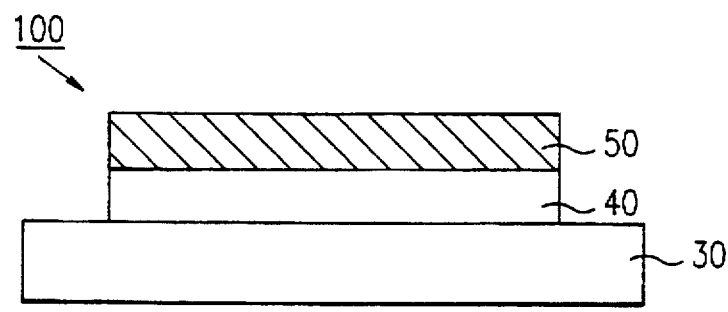
FIG. 3 is a sectional view showing a structure of a reflection-preventing layer for a display device according to the present invention.
Figure 4:
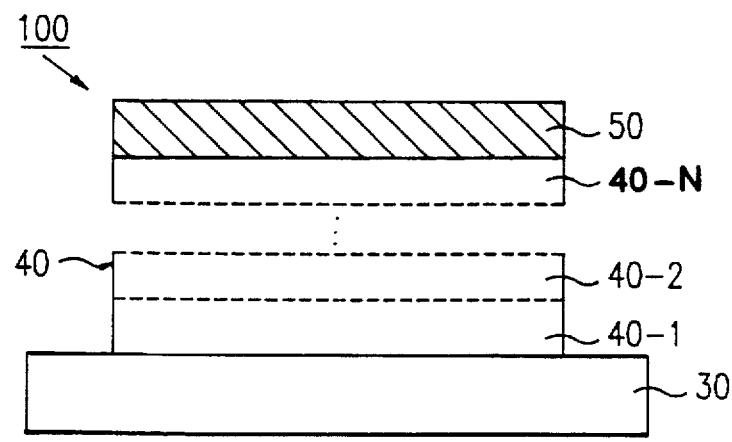
FIG. 4 is an enlarged sectional view showing the reflection-preventing layer according to the present invention shown in FIG. 3, in which the reflection-preventing layer has the dielectric layer consisting of a plurality of dielectric films.

Referring to FIGS. 3 and 4, a reflection-preventing layer according to the present invention will be described in detail.

The reflection-preventing layer 100 is formed of a dielectric layer 40, which is a collective representation of a series of dielectric films on the upper surface of a transparent insulating substrate 30 and a amorphous carbon thin-film layer 50.

Here, transparent insulating substrate 30 is composed of a polymer material or glass material.

Also, dielectric layer 40 consists of a plurality of dielectric films which are formed of layers such as $CeO_2$, $SiO_2$, etc.

Diamond-like carbon film 50 has a diamond-shaped structure.

A refractive index na of transparent insulating substrate 30 has a value approximately 1.49 to 1.6.

As one embodiment of the present invention, dielectric layer 40 consists of even-numbered dielectric films (2K, where K is a natural number).

Reflection-preventing layer 100 includes even-numbered (2K, where K is a natural number) dielectric films 40-1, . . . and 40-N formed on transparent insulating substrate 30, and amorphous carbon thin-film layer 50 having the diamond-like carbon film on the uppermost dielectric film 40-N.

The respective refractive indexes of dielectric films 40-1, . . . and 40-N are $n_1$, $n_2$, $n_3$, . . . and $n_{2k}$ from the transparent insulating substrate side, and geometrical thicknesses are $d_1$, $d_2$, $d_3$, . . . and $d_{2k}$.

Also, a refractive index of amorphous carbon thin-film layer 50 is $n_{dlc}$ and geometric thickness thereof is $d_{dlc}$. Here, the refractive index $n_1$, $n_3$, . . . and $n_{2k-1}$ of odd numbered dielectric films 40-1, 40-3, . . . and 40-2k-1 are identical to one another within the range of approximately 1.9 to 2.3.

On the other hand, refractive indexes $n_2$, $n_4$, . . . and $n_{2k}$ of the even numbered dielectric films 40-2, 40-4, . . . and 40-2k are identical to one another within the range of approximately 1.36 to 1.46 smaller than the refractive index $n_1$, $n_3$, . . . and $n_{2K-1}$ of the odd-numbered dielectric films.

The above description can be expressed by an inequation as follows:

$$n_{2k} < na < n_{2K-1}$$

where $n_1=n_3=\ldots=n_{2K-1}$, and $n_2=n_4=\ldots=n_{2k}$.

As another embodiment according to the present invention, dielectric layer 40 is formed of at least three odd-numbered films $2_{K+1}$.

Reflection-preventing layer 100 according to the present invention includes odd-numbered (2K+1, where K is a natural number) dielectric films 40-1, . . . and 40-(2K+1) formed on transparent insulating substrate 30 and a diamond-like carbon film 50 having the diamond-shaped structure formed on the uppermost dielectric film 40-(2K+1).

At this time, the refractive index $n_1$ of the first dielectric film 40-1 has a valve that approximately $1.6 < n_1 < 1.9$ and satisfies a condition that $na < n_1 < n_{2k}$.

The refractive index na of transparent insulating substrate 30 has a value that approximately $1.49 < na < 1.6$. The refractive index $n_2$, $n_4$, . . . and $n_{2k}$ of the even numbered dielectric films 40-2, 40-4, . . . and 40-2K have a value that approximately $1.9 < n_2 = n_4 = \ldots = n_{2k} < 2.3$.

Meantime, the refractive indexes $n_3$, $n_5$, . . . and $n_{2k+1}$ of odd-numbered dielectric films 40-3, 40-5, . . . 40-(2K+1) except the first oddth dielectric film 40-1 have a value that roughly $1.36 < n_3 = n_5 = \ldots = n_{2k+1} < 1.46$.

As still another embodiment of the present invention, dielectric layer 40 is of a single layer.

The reflection-preventing layer 100 includes a transparent insulating substrate 30, a single dielectric layer 40 on transparent insulating substrate 30 and a thin amorphous carbon layer 50 having the diamond-like carbon film on dielectric layer 40.

Here, the refractive index n1 of dielectric layer 40 has a value that roughly $n_1 < na < n_{dLc}$.

The refractive index $n_{dLc}$ of amorphous carbon thin-film layer 50 has a value that approximately $1.8 < n_{dLc} < 2.2$.

In the embodiments according to the present invention, respective optical thicknesses D of dielectric layer 40 and diamond-like carbon film 50 having the diamond-shaped structure are obtained by multiplying the geometrical thickness d by refractive index n of the layers stacked on transparent insulating substrate 30.

When the above description is written by an equation, $$D = d \times n$$

Respective optical thicknesses D of dielectric films 40 are provided to have a value approximately within the range of 4000.

Figure 5:
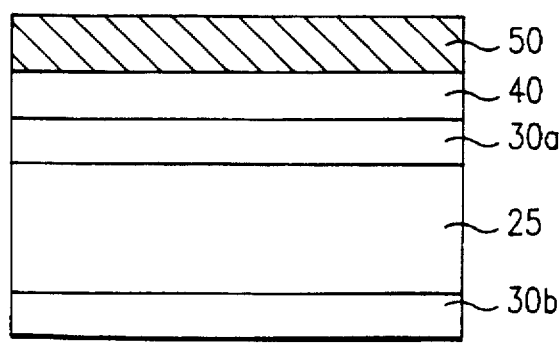
FIG. 5 is a schematical section view showing a structure of the liquid crystal display applied with the reflection-preventing layer according to the present invention.

A method for fabricating the reflection-preventing layer according to the present invention constructed as above will be described with reference to the liquid crystal display shown in FIG. 5 applied with the reflection-preventing layer.

Figure 1:
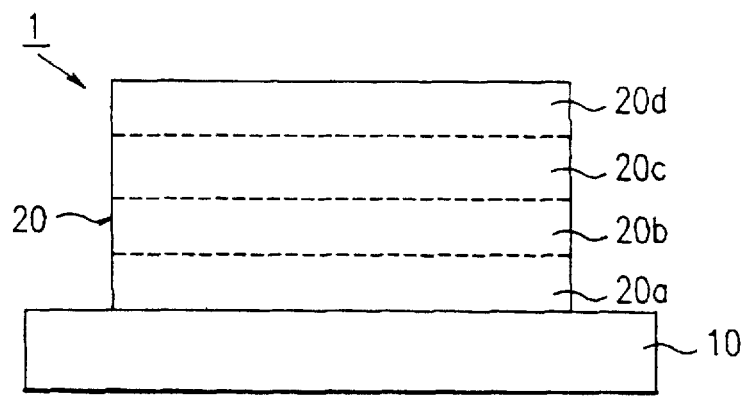
FIG. 1 is a sectional view showing a structure of a reflection-preventing layer for a conventional display device.
Figure 2:
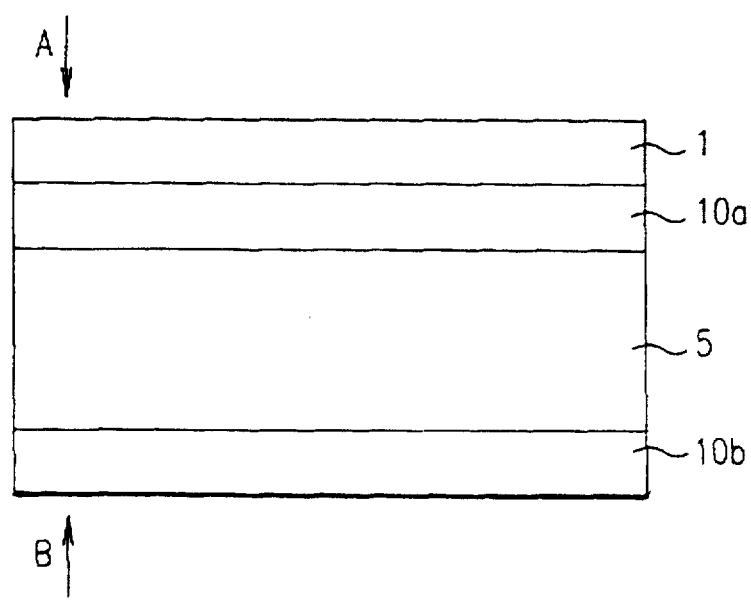
FIG. 2 is a schematical section view showing a structure of a liquid crystal display applied with the conventional reflection-preventing layer of FIG. 1.

Similar to the conventional liquid crystal display shown in FIG. 2, a liquid crystal display panel 25 is prepared, and polarization plates 30a and 30b consisting of the same polymer group or glass material are installed on the upper and lower surfaces of liquid crystal display panel 25.

Successively, a dielectric layer 40 is stacked on the upper surface of polarization plate 30a.

At this time, dielectric layer 40 is formed by sequentially stacking a plurality of dielectric films of numbering N (where N is a natural number) on the surface of polarization plate 30a.

These dielectric films may be formed by selectively using any one of a vacuum deposition method, an ion plating method and a sputtering method.

The dielectric films constituting dielectric layer 40 can be provided by selectively using any one dielectric material, e.g., $SiO_2$ and $TiO_2$ or by a material layer of $ZrO_2$, $MgF_2$, $CeF_3$, $Al_2O_3$ and SiO.

Then, diamond-like carbon film 50 having the diamond-shaped structure is deposited to have a predetermined thickness on the uppermost portion of dielectric layer 40.

Here, the depositing of the amorphous carbon thin-film layer 50 may selectively employ an ion-beam deposition method, a plasma deposition method, a sputtering method or a laser abrasion method.

The reflection characteristic by the externally incident light to the reflection-preventing layer fabricated by the above-described method will be described with reference to FIGS. 6 and 7.

FIG. 6 is a sectional view showing the border planes of respective layers constituting the reflection-preventing layer according to the present invention.

FIGS. 7a to 7d show waveforms of the reflected light in accordance with the wavelength at each border plane of FIG. 6.

As illustrated in FIG. 6, when the incident light is externally irradiated to a first border plane 70 in case of utilizing the single dielectric layer, the reflected light is produced from first, second and third border planes 70, 80 and 90 of the single dielectric layer 40 and diamond-like carbon film 50 having the diamond-shaped structure which form reflection-preventing layer 100.

At this time, as illustrated in FIGS. 7a, 7b and 7c, the reflected light has a specific amplitude in accordance with the wavelength of the light that determines the intensity of the reflected light by the difference of the reflective index among the layers forming respective border planes.

Moreover, the reflected light involves a specific phase state in accordance with respective wavelengths of the light generated by the optical thicknesses D of respective layers.

As the result, the reflected lights having specific amplitudes and phase states generated from respective border planes of the layers commonly operate to cause an interference effect.

Therefore, as shown in FIG. 7d, the reflected lights counteract one another to bring about the reflection preventing effect.

Thus, it is important that the geometric thickness d and refractive index na or each layer are determined to counteract the light reflected from the border planes of respective layers one another when forming the reflection-preventing layer.

Hereinafter, the reflection-preventing layer including the even-numbered (2K, where K is a natural number) dielectric films according to the present invention which have the above-described characteristics will be described with reference to FIGS. 11a to 11d and FIGS. 13 to 16 when the refractive index na, geometric thickness d and other conditions of respective layers are changed.

Additionally, the reflectance characteristic of the reflection-preventing layer having the single dielectric layer will be described in detail with reference to FIGS. 12 and 17.

First Embodiment

Figure 8:
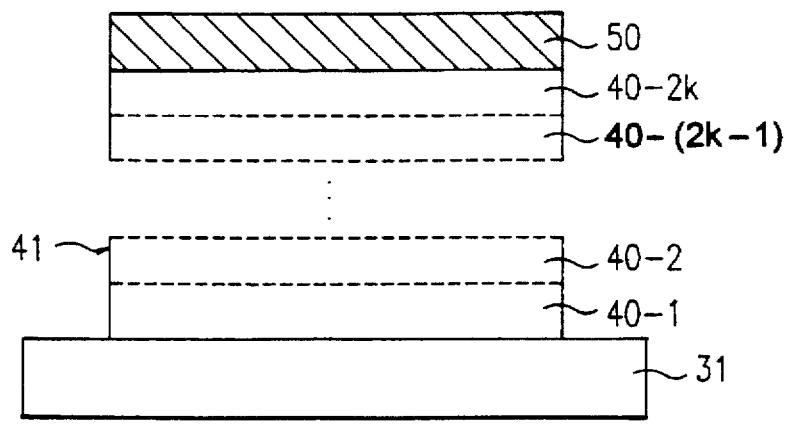
FIG. 8 is a sectional view showing the structure of the reflection-preventing layer having even-numbered dielectric films according to one embodiment of the present invention.
Figure 9:
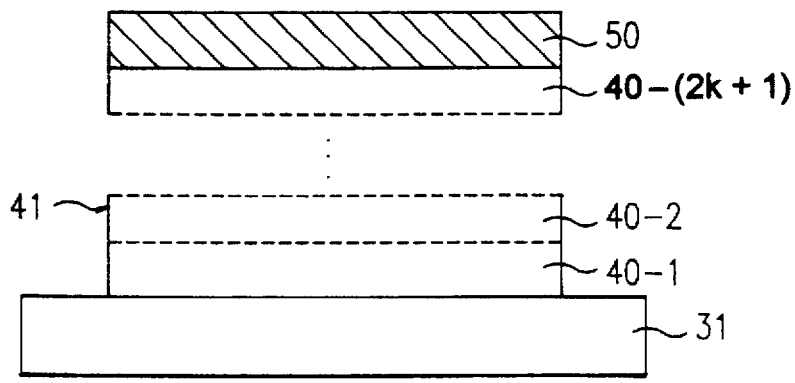
FIG. 9 is a sectional view showing the structure of the reflection-preventing layer having at least three odd-numbered dielectric films according to another embodiment of the present invention.
Figure 11A:
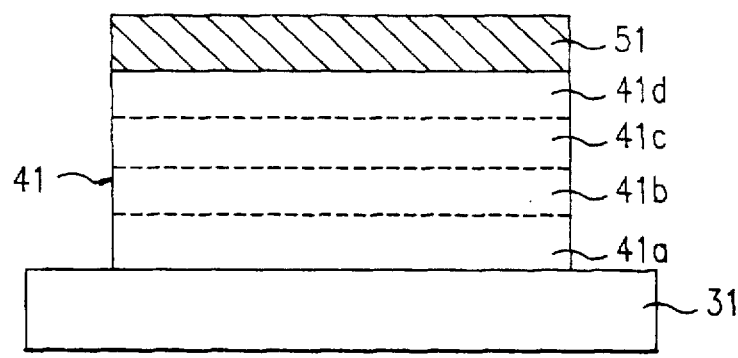
FIGS. 11a to 11c are sectional views showing the structures of the embodiments of the reflection-preventing layer using the even-numbered dielectric films of FIG. 8 when several conditions are varied.
Figure 11B:
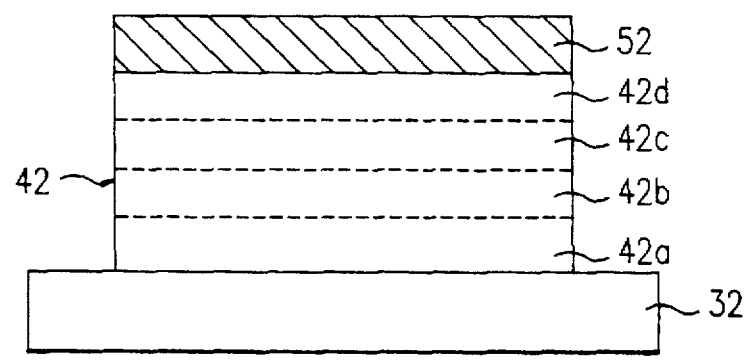
Figure 11C:
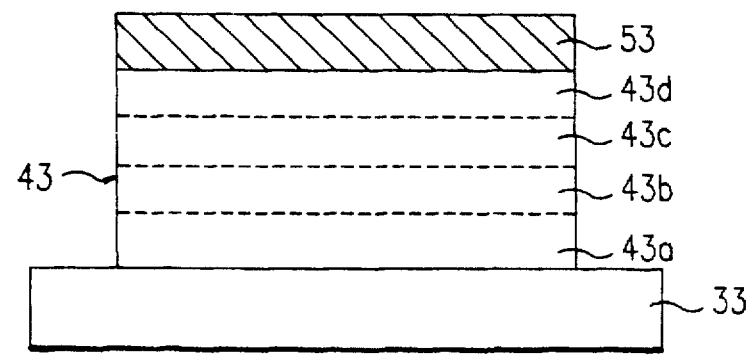

FIGS. 11a to 11c are sectional views showing the structure according to the embodiments of the reflection-preventing layer using the even-numbered dielectric films of FIG. 8, when several conditions are varied.

As shown in FIG. 11a, respective thicknesses $d_1$, $d_2$, $d_3$ and $d_4$ of first dielectric film 41a, a second dielectric film 41b, a third dielectric film 41c and a fourth dielectric film 41d are formed to be 145.7 Å, 486.3 Å, 263.0 Å and 952.0 Å.

Respective refractive indexes $n_1$, $n_2$, $n_3$ and $n_4$ of first dielectric film 41a, second dielectric film 41b, dielectric film 41c and dielectric film 41d are to be 2.3, 1.46, 2.3 and 1.46.

A diamond-like carbon film 51 having the diamond-shaped structure is formed to have the geometrical thickness $d_{dLc}$ to be 70 Å, and refractive index $n_{dLc}$ has 2.0.

At this time, the optical thickness $D_1$ of first dielectric film 41a is 335 Å, that D2 of second dielectric layer 41b is 710 Å, that D3 of third dielectric film 41c is 605 Å, and that D4 of fourth dielectric film 41d is 1390 Å.

The optical thickness $D_{dLc}$ of amorphous carbon thin-film layer 51 is 140 Å.

Then, the reflectance of the external light at the surface of the reflection-preventing layer according to the present invention constructed as above is observed.

Figure 13:
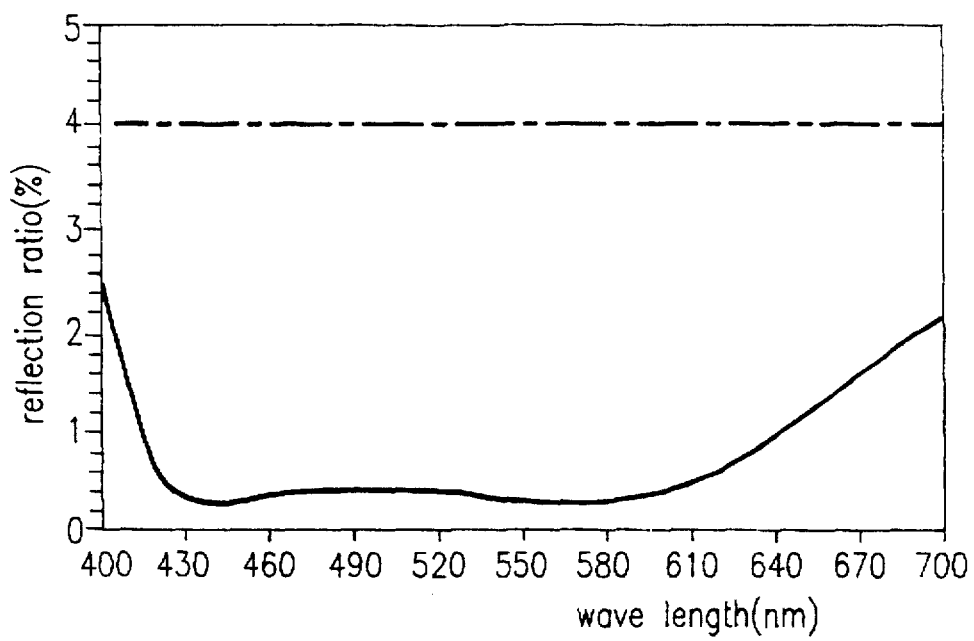
FIG. 13 is a graph representation plotting the reflectance of the reflection-preventing layer of FIG. 11a according to the first embodiment of the present invention which is obtained in accordance with the wavelength by the external light at the reflection-preventing layer.

FIG. 13 is a graph representation plotting the reflectance on the surface of the reflection-preventing layer, when the visible ray at the waveband of 4000–7000 Å is externally supplied to the surface of the reflection-preventing layer.

Here, a single-dotted line (- -) represents the conventional reflectance characteristic when the reflection-preventing layer is not formed.

A solid line (-) represents the reflectance characteristic of the reflection-preventing layer according to the present invention with the diamond-like carbon film the diamond-shaped structure.

In considering FIG. 13, a constant reflectance of approximately 4% is displayed in case of the conventional one (single-dotted line) without having the reflection-preventing layer.

Meanwhile, the reflection-preventing layer (solid line) with the thin carbon layer having the diamond-like carbon film according to the present invention is not constant in accordance with the wavelength but generally shows the reflectance significantly lower than 4%.

Second Embodiment

FIG. 11b is a sectional view showing a second embodiment of the reflection-preventing layer when the thicknesses of respective layers of the reflection-preventing layer according to the present invention are varied.

As shown in FIG. 11b, the reflection-preventing layer 100 is constructed identical to that of FIG. 11a.

A dielectric layer 42 is formed of a first dielectric film 42a, a second dielectric film 42b, a third dielectric film 42c and a fourth dielectric film 42d.

Respective thicknesses $d_1$, $d_2$, $d_3$ and $d_4$ of the dielectric films are to be 171.1 Å, 438.4 Å, 308.7 Å and 863.0 Å.

Respective refractive indexes $n_1$, $n_2$, $n_3$ and $n_4$ of first dielectric film 42a, second dielectric film 42b, dielectric film 42c and fourth dielectric film 42d are formed to be 2.3, 1.46, 2.3 and 1.46 which are the same as those of the first embodiment.

The geometric thickness $d_{dLc}$ of amorphous carbon thin-film layer 52 is 100, and refractive index $n_{dLc}$ is 2.0 identical to that of the first embodiment.

At this time, the optical thickness D1 of first dielectric film 42a is 395 Å, that D2 of second dielectric layer 42b is 640 Å, that D3 of third dielectric film 42c is 710 Å, and that D4 of fourth dielectric film 42d is 1260 Å.

The optical thickness $D_{dLc}$ of amorphous carbon thin-film layer 52 is 200 Å.

Then, the reflectance of the external light at the surface of the reflection-preventing layer according to the second embodiment of the present invention constructed as above is observed.

Figure 14:
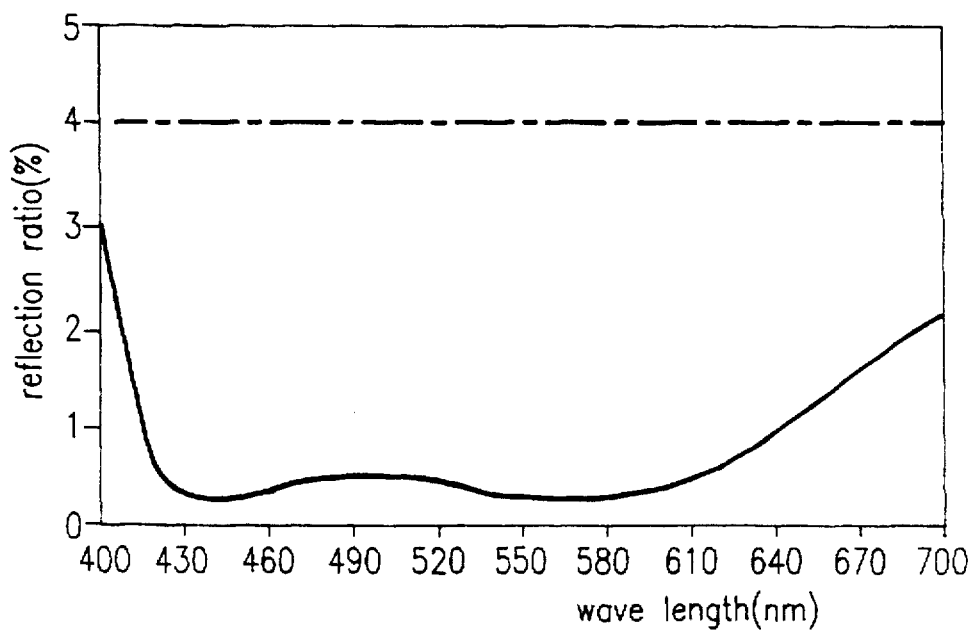
FIG. 14 is a graph representation plotting the reflectance of the reflection-preventing layer of FIG. 11b according to the first embodiment of the present invention which is obtained in accordance with the wavelength by the external light at the reflection-preventing layer.

FIG. 14 is a graph representation plotting the reflectance on the surface of the reflection-preventing layer, when the visible ray of the waveband of 4000–7000 Å is externally supplied to the surface of the reflection-preventing layer.

Referring to FIG. 14, a constant reflectance of approximately 4% is displayed as in the first embodiment without having the reflection-preventing layer (single-dotted line).

Meanwhile, the reflection-preventing layer with the thin carbon layer having the diamond-like carbon film according to the present invention is not constant in accordance with the wavelength but generally shows the reflectance significantly lower than 4% like in the first embodiment.

Third Embodiment

FIG. 11c is a sectional view showing a third embodiment of the reflection-preventing layer according to the present invention, in which, as shown in FIG. 11c, reflection-preventing layer 100 is formed identical to the first embodiment.

A dielectric layer 43 is formed of a first dielectric film 43a, a second dielectric film 43b, a third dielectric film 43c and a fourth dielectric film 43d.

These dielectric films are formed by selectively using a material such as $ZrO_2$ and $MgF_2$.

Respective thicknesses $d_1$, $d_2$, $d_3$ and $d_4$ of the dielectric films are to be 307.3 Å, 286.2 Å, 468.3 Å and 905.8 Å.

Respective refractive indexes $n_1$, $n_2$, $n_3$ and $n_4$ of first dielectric film 43a, second dielectric film 43b, dielectric film 43c and fourth dielectric film 43d are to be 2.05, 1.38, 2.05 and 1.38.

The thickness and refractive index of a thin carbon layer 53 are identical to those of the first embodiment.

At this time, the optical thickness D1 of first dielectric film 43a is 630 Å, that D2 of second dielectric layer 43b is 395 Å, that D3 of third dielectric film 43c is 960 Å, and that D4 of fourth dielectric film 43d is 1250 Å.

The optical thickness $D_{dLc}$ of amorphous carbon thin-film layer 53 is 140 identical to that of the first embodiment.

Then, the reflectance at the surface of the reflection-preventing layer according to the third embodiment of the present invention constructed as above is observed.

FIG. 14 is a graph representation plotting the reflectance on the surface of the reflection-preventing layer, when the visible ray of the waveband of 4000–7000 Å is externally supplied to the surface of the reflection-preventing layer.

Referring to FIG. 14, a constant reflectance of approximately 4.2% is displayed in case of without having the reflection-preventing layer (single-dotted line).

Meanwhile, the reflection-preventing layer (solid line) with the diamond-like carbon film the diamond-shaped structure according to the present invention is not constant in accordance with the wavelength but generally shows the reflectance significantly lower than the conventional 4%.

Fourth Embodiment

Figure 11D:
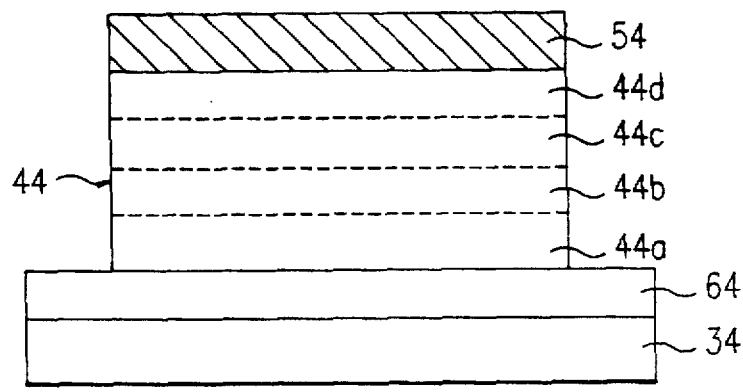
FIG. 11d is a sectional view showing the structure of the embodiment of the reflection-preventing layer using the even-numbered dielectric films of FIG. 8, wherein a cover glass is sandwiched between the substrate and first dielectric film.

FIG. 11d is a sectional view showing the fourth embodiment of the reflection-preventing layer according to the present invention, which illustrates the reflection-preventing layer added with a cover glass between the transparent insulating substrate and dielectric layer of the third embodiment.

As shown in FIG. 11d, a cover glass 64 is formed on the upper surface of a transparent insulating substrate 34, and a reflection-preventing layer 100 formed on cover glass 64 includes a dielectric layer 44 and a thin carbon layer 54 formed on dielectric layer 44.

Here, dielectric layer 44 consists of even-numbered first dielectric film 44a, a second dielectric film 44b, a third dielectric film 44c and a fourth dielectric film 44d.

Respective thicknesses $d_1$, $d_2$, $d_3$ and $d_4$ and refractive indexes $n_1$, $n_2$, $n_3$ and $n_4$ of the reflection-preventing layer 100 are formed to have the same values as those of the third embodiment.

As the result, it can be noted that, as shown in FIG. 16, the reflectance characteristic is similar to that of FIG. 15.

Fifth Embodiment

Figure 12:
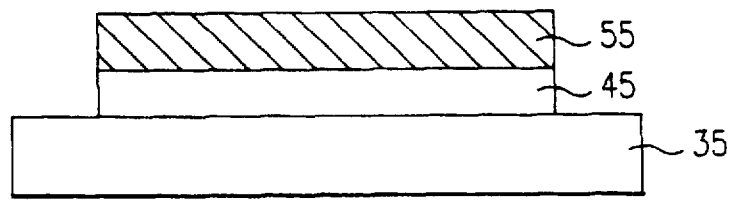
FIG. 12 shows the embodiment of the reflection-preventing layer using the single dielectric layer of FIG. 10.

FIG. 12 is a sectional view showing the reflection-preventing layer according to a fifth embodiment of the present invention when the layer thickness and refractivity are changed, in which the single dielectric layer is employed.

Figure 10:
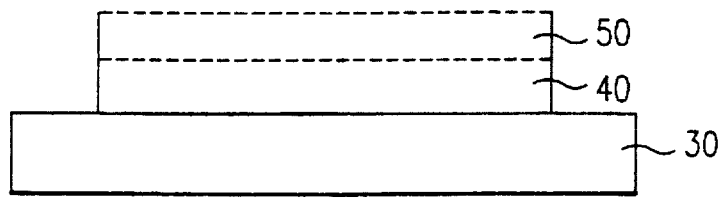
FIG. 10 is a sectional view showing the structure of the reflection-preventing layer having a single dielectric layer according to still another embodiment of the present invention.

As illustrated in FIG. 12, the construction of reflection-preventing layer 100 is the same as that of FIG. 10.

The geometric thickness of a dielectric layer 45 is to be approximately 45–90 Å.

The geometric thickness $D_{dLc}$ of diamond-like carbon film 55 having the diamond-shaped structure is to be 50–120 Å, and preferably be 80 Å.

The refractive index $n_{dLc}$ of amorphous carbon thin-film layer 55 is to be 1.8 to 2.2.

Here, the refractive index of amorphous carbon thin-film layer 55 is greater than that of a transparent insulating substrate 35 (e.g., polarization plate), and that of transparent insulating substrate 35 is to be greater than that of dielectric layer 45.

Then, the reflectance at the surface of the reflection-preventing layer according to the fifth embodiment of the present invention constructed as above is observed.

FIG. 17 is a graph representation plotting the reflectance on the surface of the reflection-preventing layer, when the visible ray of the waveband of 4000–7000 Å is externally supplied to the surface of the reflection-preventing layer.

Referring to FIG. 17, a constant reflectance of approximately 5.3% is displayed in case of without having the reflection-preventing layer (single-dotted line).

Meanwhile, the reflection-preventing layer (solid line) with the thin amorphous carbon layer having the diamond-like carbon film according to the present invention is not constant in accordance with the wavelength but generally shows the reflectance significantly lower than the conventional 5.3%.

As the result, the above characteristics as in the above embodiments can be obtained by selectively using any one of $TiO_2$, $CeF_3$, $Al_2O_3$ and $SiO$ as well as $SiO_2$, $CeO_2$, $ZrO_2$ and $MgF_2$ as the respective layers constituting the dielectric layer.

As described above, the reflection-preventing layer according to the present invention is provided with the thin carbon layer having the diamond-like carbon film on the reflection-preventing layers to lower the reflectance of the external light on the surface thereof. Therefore, a viewer feels less fatigue in his eye when applying the reflection-preventing layer to the display device, so that the displayed captions can be clearly perceived.

Therefore, the reflection-preventing layer having the diamond-like carbon film having the diamond-shaped structure is suitable for being used in various display devices such as a liquid crystal display, television Brawn tube and monitor.

Furthermore, the diamond-like carbon film forming the reflection-preventing layer is formed to have a diamond-shaped structure to have strong surface solidity and abrasion resistance, thereby preventing the damage on the surface of the various display devices.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A reflection-preventing layer for a display device comprising:

a transparent substrate;

a first dielectric layer formed on the transparent substrate, having a refractive index greater than that of the transparent substrate;

a plurality of second dielectric layers formed on the first dielectric layer, having refractive indexes greater than that of the first dielectric layer; and a diamond-like carbon film formed on the second dielectric layers.

2. A reflection-preventing layer for a display device as claimed in claim 1, wherein the diamond-like carbon film has a thickness of less than 300 Å.

3. A reflection-preventing layer for a display device as claimed in claim 1, wherein the first dielectric layer and the second dielectric layers each have optical thicknesses of less than 4000 Å.

4. A reflection-preventing layer for a display device as claimed in claim 1, wherein the dielectric layers in odd-numbered line layers of the second dielectric layer have the same refractive indexes as one another.

5. A reflection-preventing layer for a display device as claimed in claim 1, wherein the dielectric layers in even-numbered line layers of the second dielectric layer have the same refractive indexes as one another.

6. A reflection-preventing layer for a display device comprising:

a transparent substrate;

2n+1, where n is a natural number, dielectric layers including a first deposited dielectric layer on the substrate having a refractive index greater than that of the transparent substrate and smaller than the refractive indexes of the even-numbered dielectric layers; and a diamond-like carbon film formed on the 2n+1 dielectric layers.

7. A reflection-preventing layer for a display device as claimed in claim 6, wherein the even numbered layers of the 2n+1 dielectric layers have a refractive index of 1.9–2.3.

8. A reflection-preventing layer for a display device as claimed in claim 6, wherein the odd-numbered layers of the 2n+1 dielectric layers, except the first deposited dielectric layer on the substrate, have a refractive index of 1.36–1.46.

9. A reflection-preventing layer for a display device comprising:

a transparent substrate;

a dielectric layer formed on the transparent substrate having a thickness of 45–90 Å; and a diamond-like carbon film formed on the dielectric layer.

10. A reflection-preventing layer for a display device as claimed in claim 9, wherein the dielectric layer has a refractive index smaller than that of the transparent substrate.

11. A reflection-preventing layer for a display device as claimed in claim 9, wherein the diamond-like carbon film has a refractive index greater than that of the transparent substrate.

12. A reflection-preventing layer for a display device as claimed in claim 9, wherein the diamond-like carbon film has a thickness of 50–120 Å.

13. A reflection-preventing layer for a display device as claimed in claim 9, wherein the diamond-like carbon film has a refractive index of 1.8–2.2.

* * * * *